Feb. 10, 1948.  M. C. SNYDER  2,435,758
ROADWAY SANDING APPARATUS FOR VEHICLES
Filed Aug. 31, 1946   3 Sheets-Sheet 1
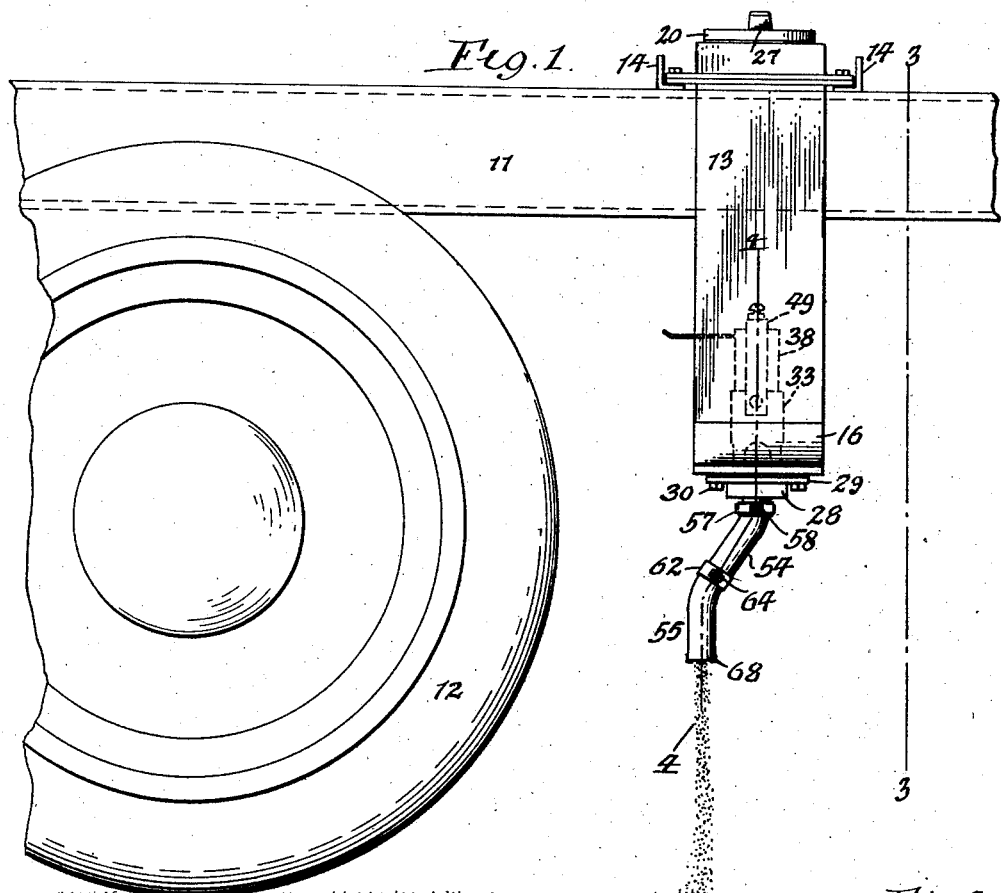
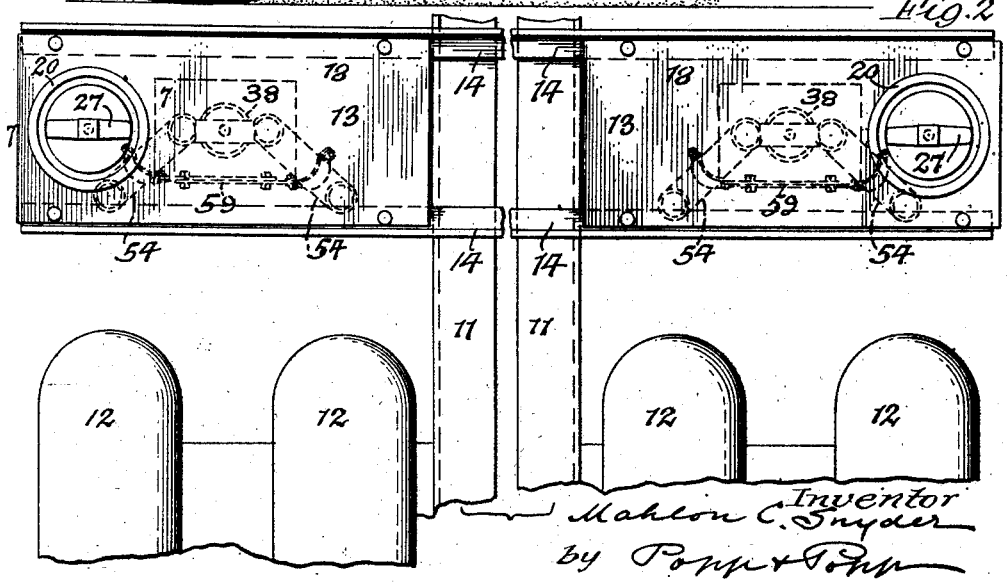

Feb. 10, 1948. M. C. SNYDER 2,435,758
ROADWAY SANDING APPARATUS FOR VEHICLES
Filed Aug. 31, 1946 3 Sheets-Sheet 2
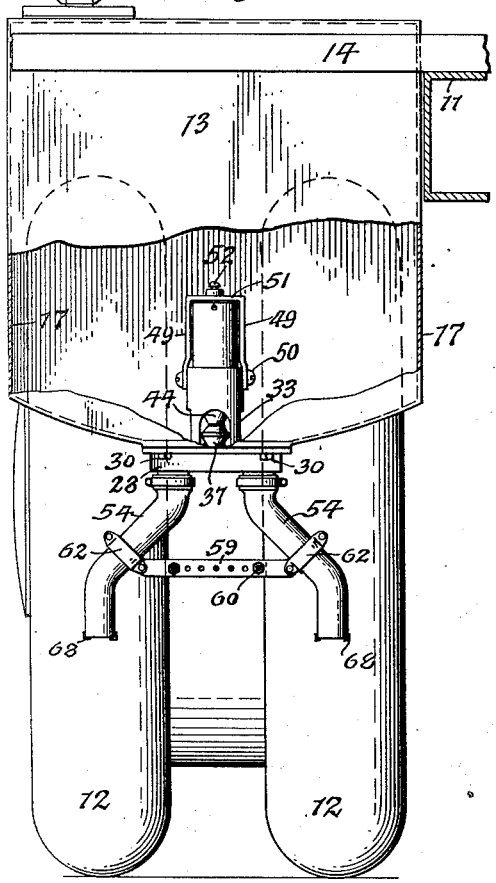
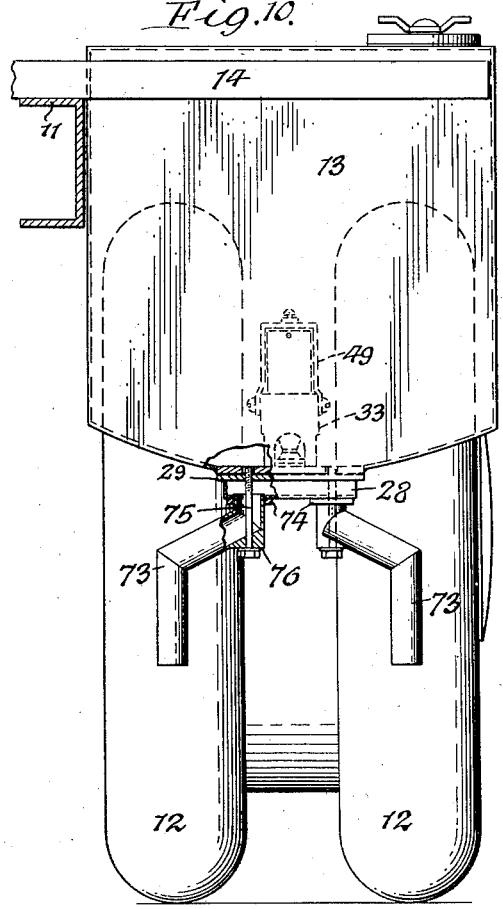
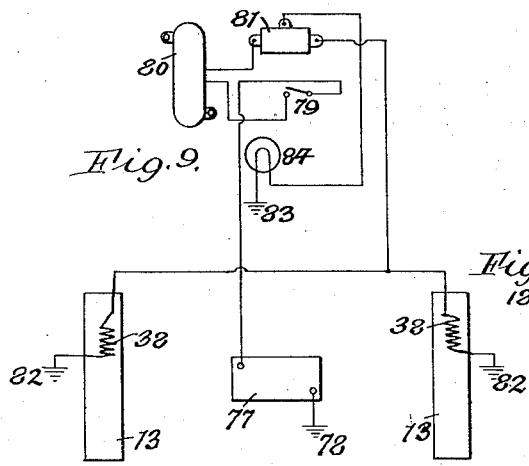
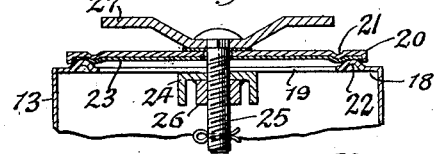
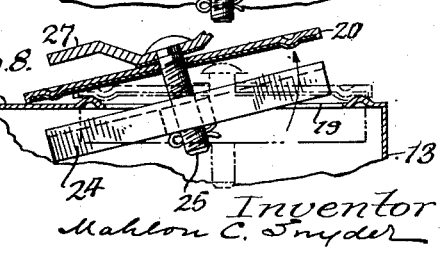

Feb. 10, 1948.  M. C. SNYDER  2,435,758
ROADWAY SANDING APPARATUS FOR VEHICLES
Filed Aug. 31, 1946  3 Sheets-Sheet 3
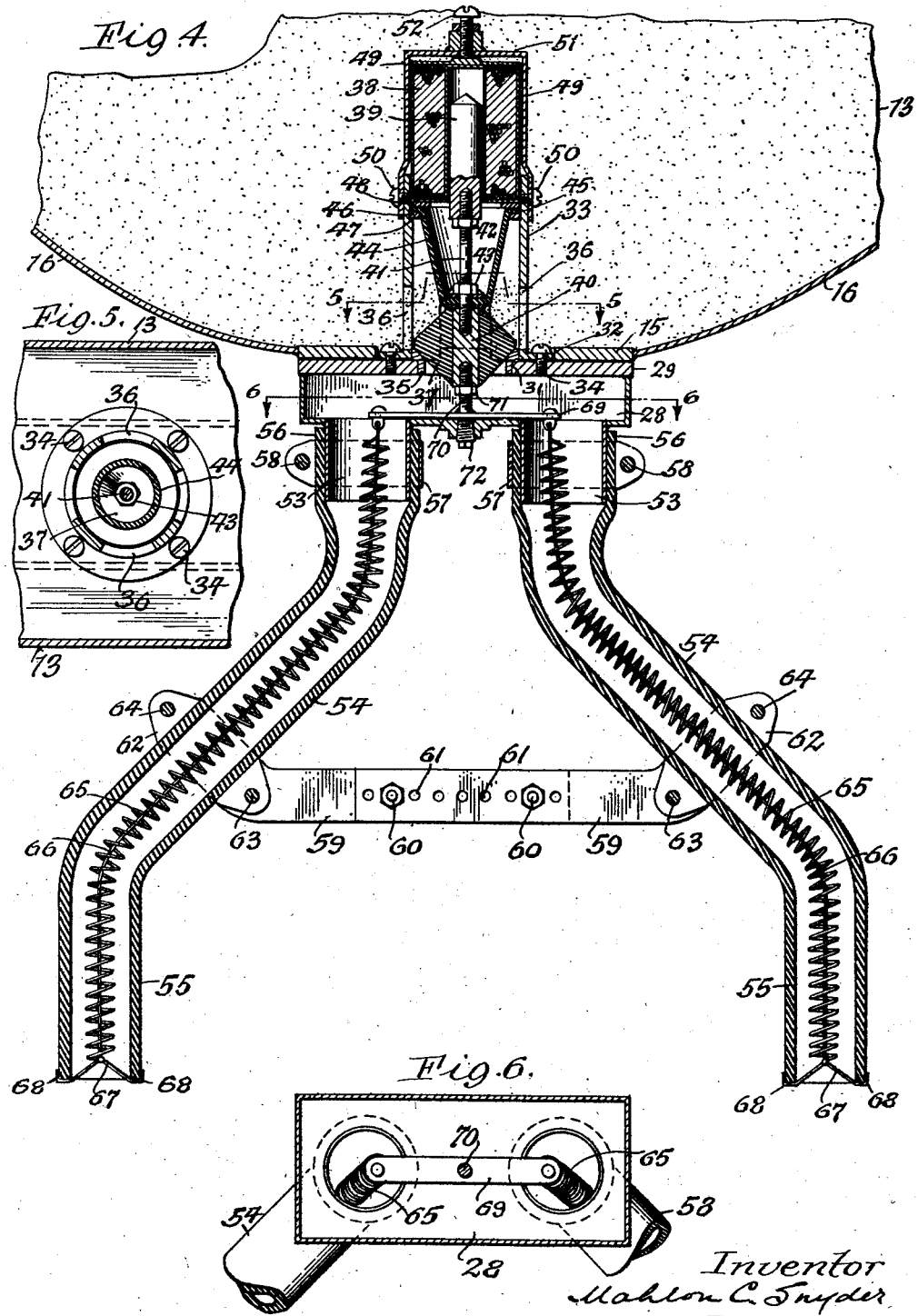
Inventor
Mahlon C. Snyder
by Popp & Popp
Attorneys Patented Feb. 10, 1948

2,435,758

UNITED STATES PATENT OFFICE 2,435,758

ROADWAY SANDING APPARATUS FOR VEHICLES

Mahlon C. Snyder, Hamburgh, N. Y.

Application August 31, 1946, Serial No. 694,337

4 Claims. (Cl. 291—36)

This invention relates to an apparatus for sanding roadways and rendering the same safer for use by vehicles.

One of the chief difficulties experienced in the use of apparatus of this character, as heretofore constructed, is the liability of the same becoming clogged in the valve device which controls the delivery of the sand from a supply box or storage hopper to the nozzles which deliver the sand to the road in advance of the wheels of a vehicle running over the road.

It is, therefore, the main purpose of this invention to provide a roadway sanding apparatus for use on automobiles and other vehicles whereby the sand is prevented from clogging the passageways but instead will flow freely and uniformly while the apparatus is in service.

In the accompanying drawings:

Fig. 1 is a fragmentary side elevation of an automobile equipped wiht a roadway sanding apparatus embodying this invention.

Fig. 2 is a fragmentary top plan view showing this invention applied to the frame of a vehicle in front of two pairs of wheels which support this frame on longitudinally opposite sides of the vehicle.

Fig. 3 is a fragmentary vertical cross section of the vehicle and the sanding apparatus mounted thereon, this section being taken on line 3—3, Fig. 1 and showing part of the sand storing box broken away.

Fig. 4 is a vertical transverse section, on an enlarged scale, of the sanding apparatus taken on line 4—4, Fig. 1.

Figs. 5 and 6 are horizontal sections taken on the correspondingly numbered lines in Fig. 4.

Fig. 7 is a vertical section, on an enlarged scale, taken on line 7—7, Fig. 2, and showing the means for closing the filling opening in the top of the sand storing box, in a closed position.

Fig. 8 is a similar view showing the closure for this opening in a partially opened position.

Fig. 9 is a wiring diagram of the electrical devices included in this invention.

Fig. 10 is a vertical transverse section, similar to Fig. 3 and showing alternate means for adjustably connecting the sand delivery spouts or nozzles with the sand distributing chamber.

In the following description similar reference characters indicate like parts in the several views of the drawings.

The numeral 11 represents the main frame or chassis of the automobile or other vehicle with the working parts of the same and is preferably provided at suitable points on its opposite longitudinal sides by pairs of wheels 12 which are mounted on the frame and rotated in any suitable manner for guiding and propelling the vehicle over the roadway.

A sanding apparatus embodying this invention is mounted on the main frame of the vehicle in front of the supporting wheels and the particular embodiment of this invention shown in the drawings is constructed as follows:

The numeral 13 represents a sand storing or supplying box or hopper arranged transversely in front of the respective wheels and connected at its upper end with cross bars 14 which are connected with the main frame of the vehicle and practically form a part of this frame. The bottom of this storage box preferably comprises a horizontal plate 15 of comparatively heavy metal and two inclined bottom plates 16 of comparatively light metal which converge downwardly from the opposite upright walls 17 of this bottom to the opposite ends or edges of the central bottom plate with which they are connected in any suitable manner.

The top of the sand storing box is closed by a horizontal plate 18 and this is provided with a filling opening 19 through which sand is introduced into the sand box for replenishing the supply of this material from time to time.

Although various means may be employed for opening and closing this filling opening those shown in the drawings are preferred and comprise a lid 20 adapted to extend over the filling opening and provided on its underside with an annular head 21 adapted to engage its outer side with the inner side of an annular head 22 formed on the upper side of the top plate 18 of the sand box. A water tight joint between these heads is formed by a soft packing 23 interposed between these heads and attached to the lid 20, as shown in Figs. 7 and 8. This lid is detachably connected with the top plate of the sand box by means which include a transverse clamping bar 24 adapted to engage with the underside of said sand box top plate 18 on opposite sides of the filling opening, and a clamping screw 25 extending through the central parts of the lid and the clamping bar and engaging its lower part with a screw nut 26 on the clamping bar while its upper end is provided above the lid with a handle 27 for manipulating the same.

The means for controlling the delivery of sand from the storage box to the roadway in accordance with this invention are constructed as follows:

The numeral 28 represents a horizontal sand distributing chamber which is arranged below the sand storage box and has its upper flatwall 29 detachably connected with the underside of the central plate 15 of the sand box by screws 30 arranged externally of the distributing chamber, as shown in Fig. 3.

The central part of the upper wall 29 is provided with a valve opening 31 which is concentric with an opening 32 in the bottom plate 15 and communicates with the lower end of an upright tubular standard 33 arranged within the lower part of the sand box. The lower end of this standard projects into the opening 32 and surrounds the opening 31 and is detachably secured to the upper side of the top plate 29 of the distributing chamber by screws 34 arranged externally of the standard, as shown in Figs. 4 and 5.

Fitted within the opening 31 and resting on the top plate 29 is an annular valve ring 35 which is provided with a tapering upwardly facing conical valve seat which forms a sand outlet or port leading from the lower end of the standard to the distributing chamber. On the lower part of the tubular standard the same is provided with a plurality of radially extending openings 36 through which sand is adapted to flow inwardly from the sand box and then discharged from the lower end of this standard through the valve ring 35 into the distributing chamber 28. The opening and closing of the outlet or port in the valve ring 35 is controlled by a valve plug or closure 37 which is preferably made of rubber and adapted to reciprocate vertically and provided on its underside with a downwardly tapering conical face which cooperates with the correspondingly shaped valve seat on the valve ring 35. Upon raising the control valve 37 the port in the valve ring 35 is uncovered which permits sand to flow from the sand storage box into the distributing chamber and upon lowering this valve into engagement with the valve ring this flow of sand will be arrested. Vertical reciprocation of the valve closure may be effected by various means but this is preferably accomplished by electrical means which open and close the sand port at intervals and also agitate the sand immediately adjacent to this closure and keep the same in free flowing condition by breaking up any lumps in the sand and thus avoid clogging of the apparatus. The preferred form of this electrical operating mechanism is constructed as follows:

The numeral 38 represents the coil of a solenoid electro-magnet mounted on the upper end of the tubular standard 33 and a plunger 39 movable vertically in this coil. Motion is transmitted from this plunger to the valve closure 37 by a core or insert 40 arranged in the center of this valve closure, a connecting rod 41 having its lower and upper ends connected respectively by screw joints with the opposing ends of the valve closure 37 and the solenoid plunger and upper and lower screw nuts 42, 43 for holding this rod and the plunger and valve closure against relative rotation.

Between the valve closure and the coil and plunger of the solenoid electro-magnet is arranged a tubular diaphragm 44 of flexible material such as rubber whereby sand in the lower part of the tubular standard is prevented from reaching this coil and plunger and interfering with the operating of the same.

This diaphragm is generally of downwardly tapering conical form and secured to the upper end of the core 40 by passing the lower end of the connecting rod 41 through the lower end of the diaphragm and clamping this part of the diaphragm between the upper end of the core and the lower screw nut 43 of this rod, as shown in Figs. 4 and 5.

The upper end of the conical diaphragm is provided with a laterally projecting upper flange 45 which rests on a lower supporting ring 46 engaging with an upwardly facing shoulder 47 on the bore of the tubular standard. The upper side of this flange is engaged by an upper clamping ring 48 and the latter in turn is engaged on its upper side by the lower end of the coil of the solenoid electro-magnet.

Means are provided for pressing the solenoid coil downwardly against the clamping ring 48 and simultaneously pressing the latter against the upper flange of the diaphragm which means preferably comprise a retaining yoke having two vertical arms 49 arranged along opposite sides of the solenoid coil and pivoted at their lower ends to the upper end of the tubular standard by screws 50, a horizontal cross bar 51 connecting the upper ends of said arms and extending over the upper end of said solenoid coil, and a clamping screw 52 working in a threaded nut mounted on said cross bar and engaging with the upper end of the solenoid coil. Upon tightening the screw 52 the upper end of the diaphragm and the lower end of the solenoid coil are secured to the standard and held securely in an operative position. When it is desired to remove the solenoid electro-magnet, the diaphragm, the valve closure and directly associated parts, for inspection or repairing, this can be done by first loosening the clamping screw 52 and then swinging the yoke laterally so that its cross bar 51 is clear of the solenoid coil after which the parts within the standard can be lifted out and held in place after being restored by using the retaining yoke and its clamping screw.

Upon passing an electric current through the coil 38 the plunger 39 will be raised and open the port in the valve ring 35 and upon breaking this current this closure will drop and close said port by gravity due to the weight of the closure and the parts connected therewith so that by intermittently closing and opening the circuit containing this coil the valve closure will be vibrated and successively open and close the sand port and at the same time agitate the sand in tubular standard, maintain the same in free flowing condition and thereby prevent the sand port from becoming clogged by lumps of sand.

As the valve closure, solenoid plunger and connecting parts are raised and lowered the flexible diaphragm is alternately folded and unfolded the requisite extent but at all times forms a sand tight partition between the lower part of the tubular standard and the solenoid electro-magnet and thus prevents any interference with the operation of the latter.

The sand which is transferred from the storage box into the distributing chamber is discharged from the latter through two outlet nozzles or nipples 53 which project downwardly from opposite ends of the bottom of the distributing chamber and into the upper ends of two delivery spouts or boots 54 from the lower ends of which the sand escapes and is deposited on the roadway ahead of the wheels of the vehicle. Each of these delivery spouts is preferably made of rubber or the like and has the form of a crank so that its lower end 55 is offset from its upper end 56 so by turning this spout about the center of its upper end it is possible to shift the lower end thereof horizontally into the required position for delivery of sand to suit the location of the particular wheel which is to be served.

In the preferred construction the upper end 56 of each of the delivery spouts surrounds one of the nozzles or nipples 53 and is adapted to be rotated thereon for bringing the lower end of the respective spout into the desired position after which the spout is held against rotation by a split clamping ring 57 surrounding the upper end of the spout and a clamping bolt 58 connecting the opposing ends of this split ring, as shown in Figs. 1, 3 and 4.

Retaining means are provided for maintaining the two sand delivery spouts in the spaced relation to which they have been adjusted so that the same will deposit the sand on the roadway as desired in front of the pair of vehicle wheels with which the sanding apparatus is associated. In their preferred form these spout retaining means, as shown in Figs. 1, 2, 3 and 4, are constructed as follows:

The numeral 59 represents two sections of a horizontally adjustable retaining bar which have their inner ends adjustably connected and their outer ends detachably connected respectively with the two delivery spouts. The adjustable connection between the retaining bar sections preferably consists of a plurality of fastening bolts 60 passing through different pairs of corresponding holes 61 formed in longitudinal rows on these bar sections so that by shifting each of these bolts selectively from one pair of holes to another the retaining bar as a whole may either be shortened or lengthened and thereby hold the delivery spout in differently spaced relations as required.

Each of the detachable connections preferably consists of a diametrically split clamping ring the sections 62 embracing one of the sand delivery spouts between its upper and lower ends, an inner bolt 63 connecting the inner parts of these sections with each other and with the outer end of one of the retaining bar sections 59, and an outer clamping bolt 64 connecting the outer parts of the sections 62.

In order to prevent the delivery spouts from becoming clogged with sand means are provided for agitating the sand in these spouts and prevent the same from forming lumps therein. The preferred means for accomplishing this purpose comprises an agitator having a body 65 of helical form made of spring wire, arranged lengthwise in the delivery spout and a line 66 of wire extending lengthwise through the helical body and connected at its upper and lower ends to the corresponding ends to said body. This agitator is connected at its lower end with the lower end of the respective sand delivery spout and is attached at its upper end to means whereby the agitator is vibrated. The preferred means for attaching the lower end of the agitator to the sand delivery spout consists of a V-shaped cross piece arranged diametrically across the lower part of the delivery spout and having its central part 67 bent upwardly and connected with the lower end of the agitator and also provided at its opposite ends with hooks 68 which engage with opposite parts of the lower end of the delivery spout, as best shown in Fig. 4.

The means for vibrating the agitating devices of each pair of sand delivery spouts are preferably so organized that the same are actuated by the electric power which operates the control valve mechanism of the respective sand storage box. As best shown in Figs. 4 and 6 these vibrating means include a horizontal vibrating bar 69 arranged lengthwise in the distributing chamber 28 and having its opposite ends connected respectively with the upper ends of the agitating devices while the central part of this vibrating bar is provided with an upwardly projecting screw 70 which threads into the lower end of the valve core 40 and is held in place by a jamb nut 71.

As the solenoid electro-magnetic actuator opens and closes the valve means which control the flow of sand from the supply box to the distributing chamber, this actuator also vibrates to agitating means in the distributing chamber and the delivery spouts so as to cause the sand to flow freely and insure depositing the same on the roadway whenever the apparatus is set in motion.

If it is desired to clean out the distributing chamber or if the valve device should become stuck on its seat due to ice formation or other cause, access may be had to this chamber and the valve device and the agitating means through an opening arranged in the underside of the distributing chamber in line with the valve device, which opening is normally closed by a screw plug 72.

In the modified form of this invention shown in Fig. 10 the sand delivery spouts or nozzles 73 are of crank shape and each of these spouts is rotatable at its upper end in an opening in the bottom of the distributing chamber and provided with a collar 74 engaging the underside of this bottom. After turning this spout into the required position the same is held in place by a vertical clamping bolt 75 passing axially through the upper end of this spout and engaging its upper threaded end with the top wall of the distributing chamber while the head at the lower end of this bolt engages with a shoulder 76 on the exterior of this spout.

Although the solenoid electro-magnet which actuates the sand valve device may be controlled in various ways it is preferable for this purpose to employ the means shown in the diagram Fig. 10 as follows:

The numeral 77 represents a battery or other source of electric current, one pole of which is grounded on the frame or chassis of the vehicle as indicated at 78. The opposite pole of this battery is connected with one side of a manually operated main switch 79 whereby the circuit of the apparatus is deliberately closed and opened for starting and stopping the operation of the sanding apparatus. The opposite side of the main switch connects with one side of a thermostatic make and break or flasher switch 80 which automatically opens and closes the electric circuit in response to successive rising and falling of the temperature of this flasher switch and thus causes the solenoid electro-magnet to open and close the sand valve device at intervals as previously described. The opposite side of the automatic flasher switch is connected with one end of the coil of a safety kick-out switch 81 which operates to automatically break the electric circuit of this sanding apparatus in the event that the circuit becomes overloaded and thereby avoids injury to the apparatus. The opposite end of the coil of the kick-out switch is connected with one end of each of the coils 38 of the solenoid electro-magnets in the several sand storage boxes 13 and the opposite end of each of these solenoid coils is grounded as shown at 82. Intermediate of its ends the coil of the kick-out switch is tapped by a by-pass line which is grounded at 83 and includes a pilot lamp 84 which is lighted and extinguished in unison with the opening and closing of the electric circuit by the flasher switch 80 and thus indicates to the operator whether or not the apparatus is functioning properly.

It is to be noted that this sanding apparatus may be assembled as a complete unit and applied to and removed as such from the lower part of the sand box very easily and without disturbing any parts of the vehicle, thereby facilitating inspection and repairing of this apparatus whenever this is desired.

As a whole this apparatus is very efficient in operation and enables the roadway to be reliably and uniformly sanded whenever required to increase safety of traffic over the same.

Moreover this apparatus is not liable to get out of order and performs its several operations automatically and thus requires minimum attention of the operator whose principal duty is to start and stop the apparatus and replenish the storage box with sand.

I claim as my invention:

1. A roadway sanding apparatus for vehicles comprising a sand storing box adapted to be mounted on the vehicle and having a sand outlet, and means for controlling the discharge of sand through said outlet including an upwardly facing valve seat surrounding said outlet, a valve closure movable downwardly toward seat for closing said outlet and upwardly for opening said outlet, operating means for actuating said valve closure including a solenoid electro-magnet arranged in sand box above said outlet and valve closure and having a plunger connected with said valve closure and an electric coil surrounding said plunger, a standard arranged in said box and having openings in its lower part for conducting sand from the interior of said box to said outlet and also having an upwardly facing shoulder on its upper part upon which the lower end of said coil is removably supported, and means for holding said coil against said shoulder.

2. A roadway sanding apparatus for vehicles comprising a sand storing box adapted to be mounted on the vehicle and having a sand outlet, and means for controlling the discharge of sand through said outlet including an upwardly facing valve seat surrounding said outlet, a valve closure movable downwardly toward seat for closing said outlet and upwardly for opening said outlet, operating means for actuating said valve closure including a solenoid electromagnet arranged in said box above said outlet and valve closure and having a plunger connected with said valve closure and an electric coil surrounding said plunger, a standard arranged in said box and having openings in its lower part for conducting sand from the interior of said box to said outlet and also having an upwardly facing shoulder on its upper part upon which the lower end of said coil is removably supported, and means for holding said coil against said shoulder including a yoke having vertical arms pivoted on opposite sides of said standard and a horizontal cross bar connecting said arms and extending over said coil, and a clamping screw mounted on said cross bar and engaging the upper end of said coil.

3. A roadway sanding apparatus for vehicles, comprising a sand storing box adapted to be mounted on the vehicle and provided at its bottom with a sand outlet, and means for controlling said outlet including a valve closure movable toward and from said outlet for closing and opening the same, a standard arranged within the box and having openings through which sand passes from said box to said outlet, means for actuating said valve closure including a solenoid electro-magnet having a plunger connected with said valve closure and an electric coil surrounding said plunger, and a flexible diaphragm enclosing the lower part of said plunger and connected at its lower end with said valve closure and at its upper end with said standard.

4. A roadway sanding apparatus for vehicles, comprising a sand storing box adapted to be mounted on the vehicle and provided at its bottom with a sand outlet, and means for controlling said outlet including a valve closure movable toward and from said outlet for closing and opening the same, a standard arranged within the box and having openings through which sand passes from said box to said outlet, means for actuating said valve closure including a solenoid electro-magnet having a plunger connected with said valve closure and an electric coil surrounding said plunger, a tubular flexible diaphragm surrounding said plunger and connected at its lower end with said valve closure, and means for securing the upper end of said diaphragm and the lower end of said coil to said standard including an internal shoulder formed on said standard, a lower supporting ring resting on said shoulder, an external flange arranged on the upper end of said diaphragm and resting on said supporting ring and an upper clamping ring interposed between said flange and said coil.

MAHLON C. SNYDER.

REFERENCES CITED

The following references are of record in the file of this patent:

UNITED STATES PATENTS

| Number | Name | Date |
| --- | --- | --- |
| 628,692 | Campbell | July 11, 1899 |
| 931,444 | Longmire | Aug. 17, 1909 |
| 1,431,307 | Humphrey | Oct. 10, 1922 |
| 1,469,627 | Duffner | Oct. 2, 1923 |
| 1,608,184 | Rumble | Nov. 23, 1926 |
| 1,887,999 | Fow | Nov. 15, 1932 |

FOREIGN PATENTS

| Number | Country | Date |
| --- | --- | --- |
| 3,642 | Great Britain | Feb. 22, 1905 |